(No Model.) 2 Sheets—Sheet 1.
J. R. SMITH.
GAS PRESSURE REGULATOR AND CUT-OFF.
No. 370,715. Patented Sept. 27, 1887.
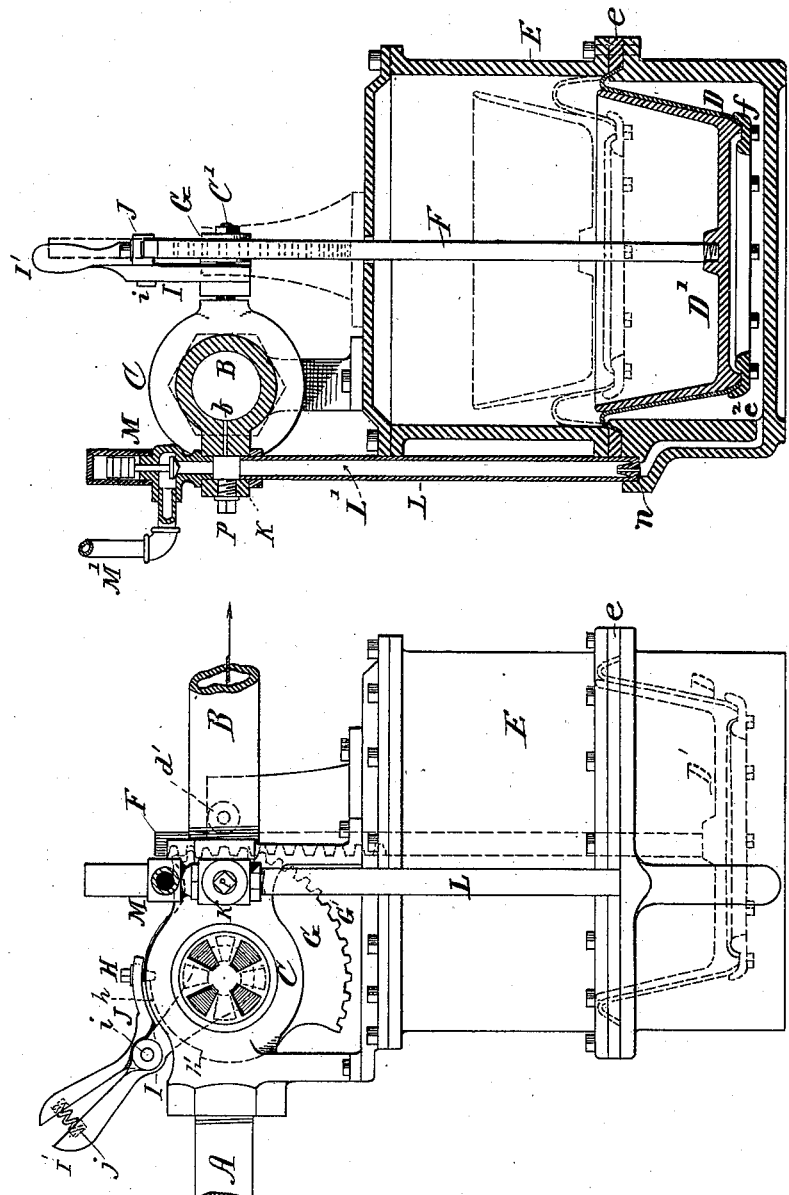
WITNESSES:
Ella P. Plenus
Frank L. Wheeler
INVENTOR:
John R. Smith
By Chas. H. Burleigh
Attorney

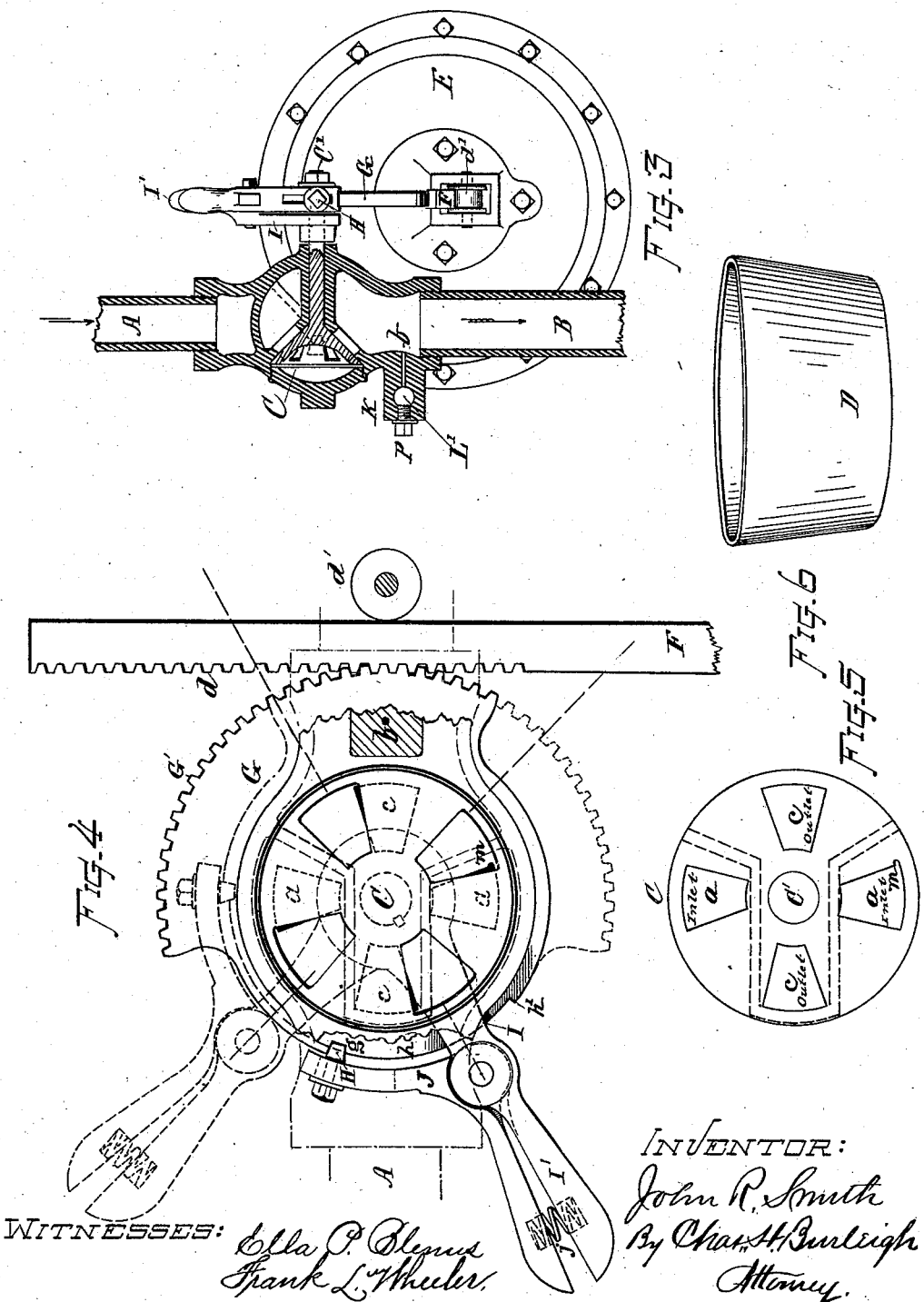

UNITED STATES PATENT OFFICE.

JOHN R. SMITH, OF SPRINGFIELD, ASSIGNOR TO THE UNION WATER METER COMPANY, OF WORCESTER, MASSACHUSETTS.

GAS-PRESSURE REGULATOR AND CUT-OFF.

SPECIFICATION forming part of Letters Patent No. 370,715, dated September 27, 1887.

Application filed March 5, 1887. Serial No. 229,780. (No model.)

*To all whom it may concern:*

Be it known that I, JOHN R. SMITH, a citizen of the United States, residing at Springfield, in the county of Hampden and State of Massachusetts, have invented certain new and useful Improvements in Gas-Pressure Regulators and Cut-Offs, of which the following, together with the accompanying drawings, is a specification sufficiently full, clear, and exact to enable persons skilled in the art to which this invention appertains to make and use the same.

This invention relates to mechanism for automatically regulating and controlling the pressure and flow of gas, air, or other fluids in pipes, the objects of my invention being to provide means for adjusting the valve after it has been closed by reason of decrease of head-pressure in a manner that will afford a gradual introduction of pressure under the float, and thereby avoid derangement by the sudden throwing up of the said float or regulator-diaphragm.

Another object of my invention is to provide an equalizing-chamber between the delivery-pipe and diaphragm-chamber, separated from each other by a contracted throat or passage, to obviate shaking or sudden fluctuations of the float or diaphragm movement.

Another object of my invention is to provide an equalizing-chamber between the delivery-pipe and diaphragm-chamber, communicating therewith by contracted throats or narrow passages and furnished with an automatic valve for relieving excess of pressure within said equalizing-chamber.

Another object of my invention is to provide a regulator-valve wherein the ports are formed to close with a shearing action to effect gradual closing or cutting off of the flow of gas by the valve.

Another object of my invention is to provide, in the inside or interior of a pressure-regulator valve, a leakage-slit or minute by-pass, to obviate total closure of the valve, under conditions hereinafter explained.

These objects I attain by mechanism the nature, construction, and operation of which are illustrated in the drawings and explained in the following description, the particular subject-matter claimed being hereinafter definitely specified.

In the drawings, Figure 1 represents a side view of my improved regulator mechanism, the cap of the regulator-valve being removed to show the interior thereof. Fig. 2 is a vertical section through the diaphragm-chamber, equalizing-chamber, and automatic relief-valve. Fig. 3 is a plan view of the mechanism with the regulator-valve shown in horizontal section. Fig. 4 is a diagram illustrating the valve and action mechanism on somewhat larger scale. Fig. 5 is a diagram of the valve-seat. Fig. 6 is a perspective view of the conoidal tubular diaphragm separate from other parts.

This invention is more especially designed for the regulation of pressures in the distribution of natural gas and for controlling the flow under excessive pressures and extreme differences of pressure, and for conditions wherein sudden extinguishment of the head-pressure or sudden stoppage of the flow in the distributing-leaders is of probable or frequent occurrence, and for all cases in which the mechanism is required to immediately accommodate itself to violent fluctuations in both supply and delivery, or in either.

While this apparatus is designed more especially for the regulation of gas, it will be understood that it may be employed for other analogous purposes.

In reference to parts, A indicates the supply-main; B, the distributing leader or pipe for conducting the gas or fluid to the place or places of use. The regulator is required to give uniform pressure in pipe B, the gas being expanded and reduced from any excessive pressure that may be supplied in pipe A.

C indicates the regulator-valve; D', the float, diaphragm-piston, or balancing device disposed within the tank or cylinder E.

F indicates the piston-rod carrying a toothed rack, d, and G the valve-operating gear.

The valve C is preferably constructed as shown, with inlet-ports a and exit-ports c formed through a conical seat in the globe or body-shell, both of which sets of ports are simultaneously controlled by an oscillating valve-plug having a spindle, C', extending through to the exterior of the shell, with the gear G mounted thereon. The gear-wheel is provided with a toothed segment that meshes with the rack $d$ on the piston-rod, said toothed segment being of sufficient extent to accommodate the upward and downward movement of the float or diaphragm piston. Said gear G is arranged to turn loose on the valve-spindle C', and adjacent thereto is a lever, I, rigidly fixed or keyed to the valve-spindle, and provided at its outer end with a handle, I', whereby the valve can be operated.

Fulcrumed upon the lever I by a pin, $i$, is a latch-lever, J, carrying a tooth or stud, H, that engages with a notch, $g$, on the periphery of the gear-wheel G, which is provided with a circular segment, $h$, over which the tooth or stud H travels, limited by a stop or lug, $h'$. The tooth H is preferably made capable of adjustment on the lever J by being clamped in a slot within said lever, or fixed thereto in other equivalent manner.

A suitable spring, $j$, is combined with the lever J for pressing the tooth H into the notch $g$. When the tooth is in engagement with the notch, the valve is moved by the action of the float or diaphragm-piston and rack. When the tooth H is raised from the notch $g$, the valve can be moved by means of the lever I independently of the movement of the diaphragm-piston and gear-wheel G; or the diaphragm can be raised or depressed without moving the valve, the gear-wheel simply turning on the valve-spindle and the tooth H sliding along the circular segment $h$.

A roll, $d'$, is mounted in a suitable bearing at the back of the piston-rod opposite the gear G, which roll serves to guide the piston-rod and support the rack in mesh with the gear without creating undue friction.

The ports in the valve-seat and the ports in the oscillating valve are made slightly inclined or oppositely diagonal to each other, so that the edges thereof will close across each other with a shearing action—that is to say, the edge of the valve at one end of the port passes over the edge of the seat before the edge of the valve at the other end of the port reaches the edge of the seat, so that the port-passage is closed or shut off by a gradual tapering or shearing action.

In one of the inlet-ports $a$, I form a small hole or slit, as at $m$, which serves as a by-pass when the valve is thrown forward, and, before complete closing, permits the leakage of gas past the valve by an upward movement of the float or diaphragm mechanism, so that the entire supply of gas cannot be suddenly admitted after being cut off from the delivery-pipe by a sudden or unexpected opening of the inlet-gate and consequent bursting of the diaphragm.

The flexible rolling tubular diaphragm D, I make of a conoidal or tapered form, as indicated in Figs. 2 and 6, the upper end of said diaphragm being of larger diameter than the lower end, and the body or head D', against which the diaphragm rolls with the upward and downward movement of the piston or float, I construct with a correspondingly-tapered exterior surface. The lower end of this tapered tubular diaphragm is secured to the lower end of the piston by a clamping-rim, $f$, while the upper end of said diaphragm is rolled outward and downward and secured at the connecting-joint between the upper and lower sections of the tank or cylinder E by a beveled annular surface and a clamping-rim, as at $e$. The method of attaching the diaphragm to the cylinder and piston is substantially the same as heretofore employed with diaphragms of cylindrical form.

The rolling diaphragm of conoidal or tapered tubular form, combined with a correspondingly downward-tapered piston-head, attains the advantage of a flexible, free, and easy rolling action as the piston moves up and down, so that the valve will be moved in quick response to slight variations of pressure, and also less liability of the fabric becoming cracked or broken by long-continued use, since there is less straining or crowding of the diaphragm fabric in its rolling or turning action, owing to the variation in size of the upper and lower diameters.

At one side of the tank, and opening into the diaphragm-chamber below the piston, is the pipe or conductor L, which supplies the gas-pressure for floating the diaphragm-piston from the distributing-leader B. The interior of said conductor connects with the leader B by a choked throat or contracted passage, $b$, and also connects with the diaphragm-chamber by a second contracted passage, as at $n$, thus forming an equalizing-chamber, L', within the conductor for overcoming vibrative pulsations of pressure. Connected with this equalizing-chamber I preferably arrange an automatic relief-valve or safety-valve, M. This equalizing and safety mechanism I prefer to construct in the manner illustrated, which is as follows: Upon the side of the regulator-valve is formed a projection, K, which is drilled through vertically. In the top of this opening is fitted the safety-valve, and in the lower end the pipe L, leading to the lower part of the tank, and communicating with the diaphragm-chamber by the passage $e^2$. Through this projection K, I drill a smaller hole, $b$, passing through the vertical opening and into the interior of the valve-casing or leader-passage. The outer end of said drill-hole is counterbored and a plug inserted, as indicated at P. This small hole $b$ forms the first contracted throat or passage into the equalizing-chamber L'. In the lower end of the pipe L, I insert a plug having an upwardly-directed point, and through the center of said plug I drill a small hole, which forms the second contracted throat or passage from the equalizing-chamber at $n$.

The automatic relief or safety valve M is a weighted puppet or other equivalent valve, that opens and lets off the gas from chamber L' when any excess over the given pressure occurs therein. It is best provided with a pipe, M', leading to the exterior of the building, or any convenient place of discharge.

While I consider this as the best method of constructing the equalizing-chamber, I do not desire to confine my invention to this particular form of parts, as it is obvious that other construction might be adopted for effecting like results by equivalent means, the essential feature being the two contracted passages $b$ and $n$, with the chamber L' disposed between said contracted passages, and the relief-valve connecting with said chamber. By this arrangement I avoid any sudden pulsation of pressure within the diaphragm-chamber and obviate the shaking or jumping action of the piston and actuating-rod, regardless of what fluctuation may occur in the distributing-pipe B, caused by the shutting off or letting on the gas or fluid at the place of use.

The relative size of the diaphragm-piston and the regulator-valve may be varied according to the requirements of the service or the degree of pressure which it may be desired to regulate.

It will be understood that gates or stop-cocks are provided in the supply-main A for closing off the head or supply, and in the distributing-leader B for shutting off the pipes at the place or places where the gas is used. These stop-cocks are not shown in the present drawings, as they are such as ordinarily employed in pipes for the distribution of gas or fluids, and are not essentially a part of my present invention.

In lieu of connecting the piston or balance rod F with the wheel G by means of intermeshing gear-teeth, said parts may be connected by any other well-known mechanical devices whereby equivalent action of the wheel is imparted by the rise and fall of the diaphragm float or piston. I prefer, however, to use the gear-teeth, as shown.

In the operation of my invention, assuming that the gates or cocks in the pipes A and B are closed, the float or piston will then stand at position of no pressure, or at its lowest limit, the valve being in position as shown in Fig. 1. Before opening the head-gate the operator, by taking hold of the handle I and lever J, disengages the tooth H from the disk or wheel G, and by swinging down said handle to the position shown in full lines on Fig. 4 rotates or oscillates the valve-plug forward, so that the bars of the valve nearly close the ports $a\ c$, or so that only the slit or notch $m$ is exposed. The head-gate can then be opened, whatever the force of head-pressure, and the gas let into the valve through the pipe A without danger of suddenly lifting the float or diaphragm-piston. The gas or fluid leaks through the by-pass $m$ of the valve until the pressure in pipe B approaches the given degree of the pressure required for practical use, and this pressure, being transmitted through the passages $b$, chamber L', and passage $n$ to the diaphragm-chamber, lifts the float or piston, as indicated by dotted lines, Fig. 2, by which movement the piston-rod F is raised, and the rack $d$ causes rotation of the gear wheel or disk G, sliding its surface $g'$ along beneath the tooth H of the shifting-lever clutch until the notch $g$ and tooth H come to a corresponding position, when the tooth, by force of spring J', drops into the notch, thus automatically interlocking the wheel G and lever I together, so that subsequent movement of the diaphragm-piston effects the oscillation of the valve C for controlling the flow and pressure, accordingly as more or less gas or fluid is required to maintain the required uniform pressure in the distributing-pipe B. In case of a sudden fluctuation of pressure in the pipe B, as by closing off at some point of using, the equalizing-chamber forms a cushion between the narrow passages at $b$ and $n$, and prevents jumping of the piston. If too severe a pressure is let through the passage to the chamber L', the valve M lifts and relieves the pressure before it injuriously acts in the diaphragm-chamber for throwing up the diaphragm-piston.

What I claim as of my invention, and desire to secure by Letters Patent, is—

1. In a pressure-regulator, the combination, with the regulating-valve and balance-piston mechanism, of an actuating wheel or gear mounted to turn upon the valve-spindle and connected for operation by the piston-rod, a handle-lever fixed on the valve-spindle, and a disengagable locking device, whereby said actuating-wheel and handle-lever are connected and disconnected, substantially as and for the purpose set forth.

2. In a pressure-regulator, the combination of an oscillating valve, a handle or lever keyed to the valve-spindle, an actuating-wheel mounted loose on the valve-spindle, and having an indent or notch and an adjacent sliding surface, a spring-pressed clutch device having a tooth or lug adapted to slide on said surface and to engage with said notch, and operating devices for moving said wheel in accordance with the fluctuations of pressure in the diaphragm-chamber, substantially as and for the purpose set forth.

3. The combination, substantially as set forth, of the valve C, hand-lever I, clutch-lever J, having the tooth H, the wheel G, having gears, the segment G', notch $g$, surface $h$, and lug $h'$, the piston-rod F, provided with rack $d$, the piston D, and cylinder E, connected with the pipe B, substantially as and for the purposes set forth.

4. The combination, with the distributing-pipe and the diaphragm-chamber in a pressure-regulator, of an equalizing-chamber disposed intermediate thereof and communicating with said pipe by a contracted throat or passage, as $b$, and with said diaphragm-chamber by a contracted throat-passage, as $n$, substantially as and for the purpose set forth.

5. In a gas-pressure regulator, the combination, with the distributing leader-pipe and the diaphragm-chamber, of an equalizing-chamber, as L', disposed intermediate thereof and communicating with said pipe and chamber by two contracted throats or passages, as $b$ and $n$, and an automatic relief or safety valve connected with said equalizing-chamber, substantially as and for the purpose set forth.

6. The combination of the valve C, the valve-casing provided with the side projection, K, vertically recessed and having the transverse vent $b$, the relief-valve supported at the top of said projection, the pipe L, leading from the bottom thereof to the diaphragm-chamber, and the stop-plug P, substantially as set forth.

7. A pressure-regulating valve having its seat notched or slitted, as at $m$, at the closing side of the inlet-port, substantially as and for the purpose set forth.

8. In a gas-pressure regulator, a regulating-valve having a leakage passway or slit, as $m$, in combination with a balancing float or diaphragm-piston and valve-actuating mechanism, whereby said valve is controlled, substantially as and for the purpose set forth.

9. In a fluid-pressure regulator, the combination, with the float-piston and valve-actuating devices, of an oscillating valve having the ports through its seat disposed obliquely in relation to the ports through the plug, whereby the edges of the ports close by a shearing action or gradual cut-off from one end of the port to the other, substantially as and for the purpose set forth.

Witness my hand this 26th day of February, A. D. 1887.

JOHN R. SMITH.

Witnesses:
 CHAS. H. BURLEIGH,
 ELLA P. BLENUS.